(12) United States Patent
Lin et al.

(10) Patent No.: US 7,958,109 B2
(45) Date of Patent: Jun. 7, 2011

(54) INTENT DRIVEN SEARCH RESULT RICH ABSTRACTS

(75) Inventors: Yi-An Lin, Sunnyvale, CA (US);
Youssef Billawala, Campbell, CA (US);
Kevin Haas, San Jose, CA (US); Jan Pfeifer, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 271 days.

(21) Appl. No.: 12/367,225

(22) Filed: Feb. 6, 2009

(65) Prior Publication Data

US 2010/0205199 A1    Aug. 12, 2010

(51) Int. Cl.
*G06F 17/30* (2006.01)
(52) U.S. Cl. ........................................ 707/706; 707/722
(58) Field of Classification Search .................. 707/706, 707/722
See application file for complete search history.

(56) References Cited

U.S. PATENT DOCUMENTS

| | | | |
|---|---|---|---|
| 5,715,453 A | 2/1998 | Stewart | |
| 5,778,397 A | 7/1998 | Kupiec et al. | |
| 5,913,215 A | 6/1999 | Rubinstein et al. | |
| 6,092,074 A * | 7/2000 | Rodkin et al. | 715/205 |
| 6,334,132 B1 | 12/2001 | Weeks | |
| 6,349,316 B2 | 2/2002 | Fein et al. | |
| 6,516,312 B1 * | 2/2003 | Kraft et al. | 707/610 |
| 6,581,057 B1 | 6/2003 | Witbrock et al. | |
| 6,694,331 B2 * | 2/2004 | Lee | 707/706 |
| 6,760,720 B1 * | 7/2004 | De Bellis | 707/706 |
| 6,766,287 B1 | 7/2004 | Kupiec et al. | |
| 6,820,237 B1 | 11/2004 | Abu-Hakima et al. | |
| 6,836,768 B1 * | 12/2004 | Hirsch | 715/225 |
| 6,904,564 B1 | 6/2005 | Harris et al. | |
| 6,999,961 B2 * | 2/2006 | Hall | 707/722 |

(Continued)

FOREIGN PATENT DOCUMENTS

WO    WO 0219172    3/2002

OTHER PUBLICATIONS

Glossbrenner et al., "Search Engines for the World Wide Web", Chapter 6, 3rd Edition, Peachpit Press, 2001 (9 pages).

(Continued)

*Primary Examiner* — Don Wong
*Assistant Examiner* — Kim T Nguyen
(74) *Attorney, Agent, or Firm* — Hickman Palermo Truong & Becker LLP; Daniel D. Ledesma

(57) ABSTRACT

Techniques for providing useful information to a user in response to a search query are provided. Based on the search query, one or more potential intents of the user are identified and a plurality of matching resources are identified. For at least one matching resource, a particular abstract template is selected based on the one or more potential intents. Each abstract (a) corresponds to a different intent than any other intent to which any other abstract template of the plurality of abstract templates corresponds, and (b) dictates a different manner of displaying information about a matching resource than any other manner of displaying dictated by any other abstract template of the plurality of abstract templates. A search results page is generated and sent to the user. The search results page includes an abstract for the at least one matching resource. The abstract is displayed based on the particular abstract template.

22 Claims, 3 Drawing Sheets

U.S. PATENT DOCUMENTS

| | | | | |
|---|---|---|---|---|
| 7,130,841 B1* | 10/2006 | Goel et al. | | 707/722 |
| 7,165,080 B2* | 1/2007 | Kotcheff et al. | | 707/706 |
| 7,177,862 B2* | 2/2007 | Zhang et al. | | 707/722 |
| 7,249,122 B1 | 7/2007 | Bushee et al. | | |
| 7,376,641 B2* | 5/2008 | Chang et al. | | 707/708 |
| 2002/0129014 A1 | 9/2002 | Kim et al. | | |
| 2002/0138528 A1 | 9/2002 | Gong et al. | | |
| 2006/0064411 A1* | 3/2006 | Gross et al. | | 707/3 |
| 2010/0057577 A1* | 3/2010 | Stefik et al. | | 705/14.73 |
| 2010/0070448 A1* | 3/2010 | Omoigui | | 706/47 |
| 2010/0312724 A1* | 12/2010 | Pinckney et al. | | 706/11 |

OTHER PUBLICATIONS

Berger et al., "OCELOT: A system for summarizing web pages", In Proceedings of the 23$^{rd}$ Annual International ACM SIGIR Conference on Research and Development in Information Retrieval, pp. 144-151, 2000 (8 pages).

Berger, Adam et al., "Query-Relevant Summarization using FAQs," date unknown (8 pages).

Mittal, Vibhu et al., "Selecting Text Spans for Document Summaries: Heuristics and Metrics," 1999, American Association of Artificial Intelligence, (7 pages).

* cited by examiner

SEARCH RESULT 110

Amazon.com: Getting Things Done: The Art of Stress-Free Productivity ...
Price: $45.00 Sale: $10.20 as of 10/30/08
Amazon.com: Getting Things Done: The Art of Stress-Free Productivity: David Allen: Books ... the new york times® best sellers. Libros en español. Bargain Books ...
amazon.com/Getting-Things-Done-Stress-Free-Productivity/dp/0142000280 - 343k - Cached

SEARCH RESULT 120

Go Camping America | Campground Overview
• Address: 214 North Street Whately, MA 01093
• Phone: (413) 665-4941
Copyright © 2008 The National Association of RV Parks and Campgrounds (ARVC) ... Any redistribution or reproduction of any materials herein is strictly prohibited. ...
gocampingamerica.com/Massachusetts/Pioneer/WhiteBirchCampground.html - 87k - Cached

SEARCH RESULT 130

Hotel Reviews of Sheraton Bloomingotn Hotel, Minneapolis South ...
Reviewed on: 5-Jul-08
Traveler ratings summary of Sheraton Bloomington Hotel, Minneapolis ... Scores are based on a 1 (poor) to 5 (excellent) rating system. Overall satisfaction ...
expedia.com/pub/.../qscr=dspv/htid=22836/nojs=1/eapi=23708/crti=7 - 90k - Cached

SEARCH RESULT 140

Pastors for Peace Cuba Caravan Reception | Dallas Peace Center
• Date: June 27 2008
• Address: 5200 Bryan St. @ Munger Dallas, TX United States
Join nearly 40 Caravanistas from Pastors for Peace, who will be carrying tons of ... Rev. Thomas Smith, Pastor Monumental Baptist Church Pittsburg, Pennsylvania and ...
dallaspeacecenter.org/node/3243 - Cached

SEARCH RESULT 150

World War II (1939-1945) Message Board
Posted: 11/3/06 3:31 PM | Total Replies: 5
Discussion mainly for students. Covers a variety of topics related to the war. ... Shopping Cart Checkout. Home : History & Biography : History Message Boards : ...
mb.sparknotes.com/mb.epl?b=388 - 201k - Cached

*FIG. 1*

INTENT DRIVEN SEARCH RESULT RICH ABSTRACTS

RELATED CASES

The present application is related to U.S. patent application Ser. No. 12/172,165, entitled "GENERATING DESCRIPTIONS OF MATCHING RESOURCES BASED ON THE KIND, QUALITY, AND RELEVANCE OF AVAILABLE SOURCES OF INFORMATION ABOUT THE MATCHING RESOURCES," filed on Jul. 11, 2008, the entire contents of which are incorporated by reference as if fully disclosed herein.

FIELD OF THE INVENTION

The present invention relates to search engines, and in particular, to generating descriptions of matching resources based on the potential intent of user that submits a search query.

BACKGROUND OF THE INVENTION

World Wide Web

The Internet is a worldwide system of computer networks and is a public, self-sustaining facility that is accessible to tens of millions of people worldwide. The most widely used part of the Internet is the World Wide Web, often abbreviated "WWW" or simply referred to as just "the web". The web is an Internet service that organizes information through the use of hypermedia. The HyperText Markup Language ("HTML") is typically used to specify the contents and format of a hypermedia document (e.g., a web page).

In this context, an HTML file is a file that contains source code for a particular web page. Typically, an HTML document includes one or more pre-defined HTML tags and their properties, and text enclosed between the tags. A web page is the image or collection of images that is displayed to a user when a particular HTML file is rendered by a browser application program. Unless specifically stated, an electronic or web document may refer to either the source code for a particular web page or the web page itself. Each page can contain embedded references to images, audio, video or other web documents. The most common type of reference used to identify and locate resources on the Internet is the Uniform Resource Locator, or URL. In the context of the web, a user, using a web browser, browses for information by following references that are embedded in each of the documents. The HyperText Transfer Protocol ("HTTP") is the protocol used to access a web document and the references that are based on HTTP are referred to as hyperlinks (formerly, "hypertext links").

Search Engines

Through the use of the web, individuals have access to millions of pages of information. However, a significant drawback with using the web is that because there is so little organization to the web, at times it can be extremely difficult for users to locate the particular pages that contain the information that is of interest to them. To address this problem, a mechanism known as a "search engine" has been developed to index a large number of web pages and to provide an interface that can be used to search the indexed information by entering certain words or phases to be queried. These search terms are often referred to as "keywords".

Indexes used by search engines are conceptually similar to the normal indexes that are typically found at the end of a book, in that both kinds of indexes comprise an ordered list of information accompanied with the location of the information. An "index word set" of a document is the set of words that are mapped to the document, in an index. For example, an index word set of a web page is the set of words that are mapped to the web page, in an index. For documents that are not indexed, the index word set is empty.

Although there are many popular Internet search engines, they are generally constructed using the same three common parts. First, each search engine has at least one, but typically more, "web crawler" (also referred to as "crawler", "spider", "robot") that "crawls" across the Internet in a methodical and automated manner to locate web documents around the world. Upon locating a document, the crawler stores the document's URL, and follows any hyperlinks associated with the document to locate other web documents. Second, each search engine contains information extraction and indexing mechanisms that extract and index certain information about the documents that were located by the crawler. In general, index information is generated based on the contents of the HTML file associated with the document. The indexing mechanism stores the index information in large databases that can typically hold an enormous amount of information. Third, each search engine provides a search tool that allows users, through a user interface, to search the databases in order to locate specific documents, and their location on the web (e.g., a URL), that contain information that is of interest to them.

The search engine interface allows users to specify their search criteria (e.g., keywords) and, after performing a search, an interface for displaying the search results. Typically, the search engine orders the search results prior to presenting the search results interface to the user. The order usually takes the form of a "ranking," where the document with the highest ranking is the document considered most likely to satisfy the interest reflected in the search criteria specified by the user. Once the matching documents have been determined, and the display order of those documents has been determined, the search engine sends, to the user that issued the search, a "search results page" that presents information about the matching documents in the selected display order.

Search Results

Depending on the query terms used and the number of pages that contain those query terms, search results may contain so many matching resources that a user may be overwhelmed when trying to determine which matching resources to investigate further. To assist a user in selecting one or more matching resources from a list, the search results may include a short description, or abstract, for each matching resource. Abstracts typically also include a clickable title and a URL of the corresponding matching resource. By reading the abstract for a given matching resource, a user should be able to better determine whether the matching resource merits further investigation. Abstracts should be relatively short, so that a user may quickly judge the relevance of matching resources listed in the search results.

Unfortunately, abstracts that are displayed by existing search engines frequently fail to provide a user with the most useful information that is contained on a page. This is because the search results generated by existing search engines typically include abstracts that simply include one or two portions of sentences in the matching resources. Generating abstracts based on query terms does not always fulfill the needs of users either in finding the information needed directly from the search result page or in identifying which result is more relevant than others. The following are three examples of deficient abstracts.

First, when a user is searching for "recent news," a page containing the term "recent" 3 years ago may be extracted with the term match "recent news" in the abstract. Generally, when users are looking for time-sensitive information, such users tend to weigh recent articles more heavily than older ones. Typical search engines do not guarantee that current abstracts are associated with date information for time-sensitive queries.

Second, when a user is searching for a local restaurant, the user may have the intent of retrieving address and phone number information from a webpage but the user might not have "address" in the query. Current abstracts do not display such information without explicit instructions in the corresponding queries. Even if the user has the word "address" in the query, the abstract may include a segment from the corresponding webpage that contains the word "address" but not necessarily the address itself.

Third, when a query is ambiguous with respect to the intent, the user may need additional information from the search results to help disambiguate whether the information includes images or other types of information. Current abstracts only provide textual information that is either to the left or right of the matching query term(s). Such textual information is often not helpful in disambiguating the query.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a diagram that depicts abstracts of multiple search results, according to an embodiment of the invention;

DETAILED DESCRIPTION

Figure 2:
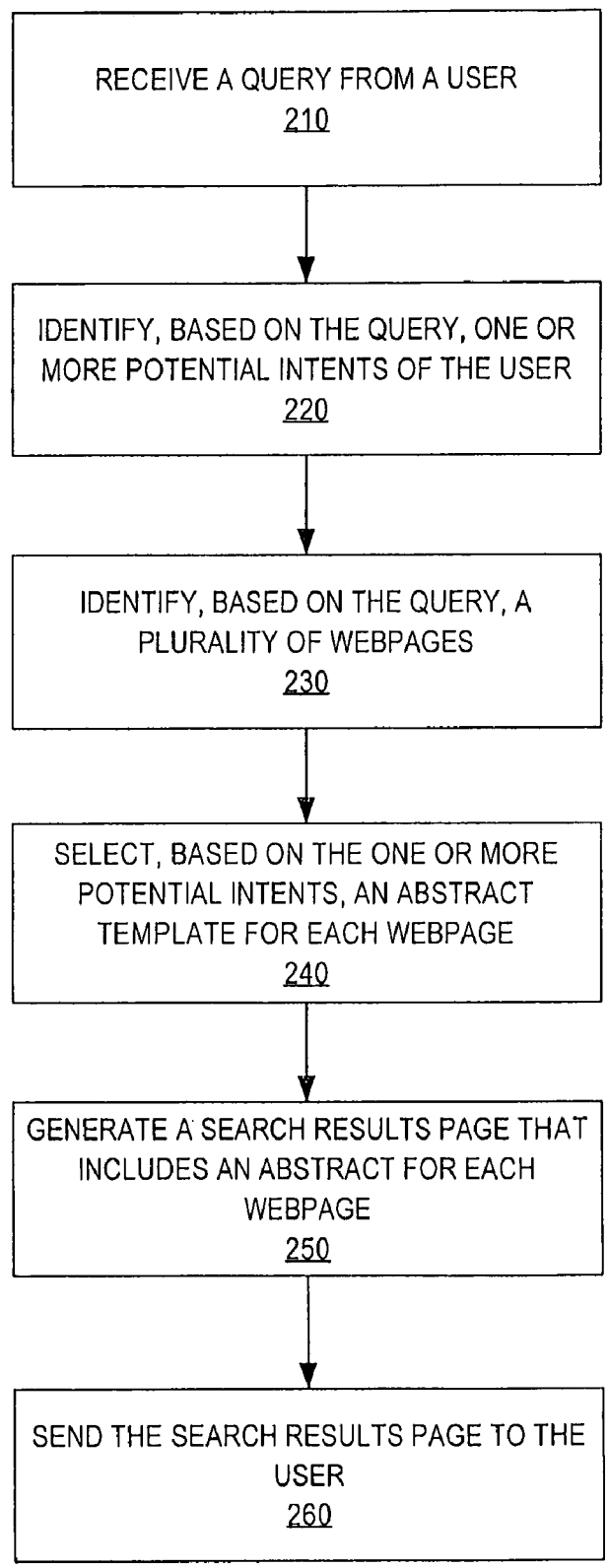
FIG. 2 is a flow diagram that depicts how an example query is processed, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for displaying information about webpages in a search results page based on the intent of a user submitting a query. The intent of the user is derived from the query and, optionally, from other information, such as information about the user. The intent of the user is taken into account in order to determine which abstract template, among a plurality of abstract templates, to select. An abstract template is a template, used by a search engine (or component thereof), to dictate which kind of information (and/or how the information) about a webpage should be displayed in an abstract generated for that webpage. Each abstract template corresponds to a different intent. One or more abstracts in a search results page are displayed using a selected abstract template.

Although references are made herein to "webpages," embodiments of the invention include other types of matching resources, such as PDF files, audio files, image files, video files, and executable files.

Information Extraction

Displayed abstracts in a search results page (SERP) require information extracted from and/or about the corresponding webpage. Therefore, an abstract template relies on an information extraction technique to extract information about a webpage in order to populate an abstract of the webpage according to the information called for by the abstract template.

Embodiments of the invention are not limited to any particular information extraction technique. Examples of information extraction techniques are described in: U.S. patent application Ser. No. 11/945,749, entitled "TECHNIQUES FOR INDUCING HIGH QUALITY STRUCTURAL TEMPLATES FOR ELECTRONIC DOCUMENTS", filed on Nov. 27, 2007; and U.S. patent application Ser. No. 12/030, 301, entitled "ADAPTIVE SAMPLING OF WEB PAGES FOR EXTRACTION", filed on Feb. 13, 2008, both of which are incorporated by reference as if fully set forth herein.

Resource Description Framework

Another information extraction technique involves the Resource Description Framework (RDF). RDF is a set of World Wide Web Consortium (W3C) specifications, which was originally designed as a metadata data model. RDF has come to be used as a general method of modeling information through a variety of syntax formats. The RDF data model is based upon the idea of making statements about Web resources in the form of subject-predicate-object expressions, called "triples" in RDF terminology. The subject denotes the resource, and the predicate denotes traits or aspects of the resource and expresses a relationship between the subject and the object. For example, one way to represent the notion "The sky has the color blue" in RDF is as the triple: a subject denoting "the sky," a predicate denoting "has the color," and an object denoting "blue."

If a website designer uses RDF in designing a website, then an information extractor does not have to "guess" as to what the website and corresponding webpages are about to the same extent that the information extractor guesses with respect to non-RDF-based webpages. Thus, an information extractor leverages RDF information in webpages to extract relevant content. For example, a webpage may include a health article. The RDF information in the webpage may explicitly indicate the title of the article, the date on which the article was published, the authors of the article, and a brief description (e.g., less than 20 words) of the article. As a result, an information extractor is not required to perform analytically intensive computations to determine the title, date, authors, and brief description of the article. Thus, RDF information may be used to populate the fields of an abstract template, as disclosed herein.

Intent Identification

The "intent" of a user refers to one or more target categories of information that the user is seeking while submitting a query. For example, with the query "digital camera," a user may intend to (a) view reviews of digital cameras, (b) view price information about the latest digital cameras, or (c) locate the nearest store that sells digital cameras. In this example, there are at least three possible user intents: review information, price information, and location information. One or more of these possible intents might not be the user's actual intent.

It is generally better to have more query terms than less in order to accurately estimate the intent of the user. For example, a search engine is more likely to determine that a user submitting the query "digital camera stores" intends to locate, near the user, a store that sells digital cameras.

Also, it is generally better to have more information than less about the user submitting the query. For example, a search engine may know that the user submitting a query is from a particular city that is relatively affluent. Accordingly, the search engine, upon receiving the query "digital cameras," may predict that the user is searching for relatively high-end digital cameras. As a result, the search engine identifies webpages that include information about high-end digital cameras. As another example, the search engine may have received, from the user, previous queries that indicate that the user was searching for pricing information of other electronic equipment, such as DVD players and televisions. As a result, the search engine identifies webpages that include pricing information about digital cameras.

The intent of a query-submitting user is used to select, from a set of multiple different abstract templates, a particular abstract template for one or more webpages. Embodiments of the invention are not limited to any particular intent identification technique. Intent identification may be performed manually by the user or automatically by one or more computer programs.

An example of manual intent identification is a user specifying the intent directly in the query. For example, a user may enter "digital cameral shopping." Shopping may be an intent recognized by the search engine in that one or more abstract templates may correspond to the "shopping" intent.

Another example of manual intent identification is providing, to the user, an interface that displays a plurality of intents to the user and allows the user to select one or more of those intents prior to the user entering or submitting a query.

In a related example, after submitting a query, a user is presented with a page (e.g., a SERP) that includes a plurality of potential intents. In this scenario, the search engine analyzes the query and provides the user with the option to select one or more of the plurality of potential intents. The plurality of potential intents may be narrowed down from a larger set of potent intents based on one or more criteria, such as the terms of the query, profile information about the user, time of day, geographical location of the user, etc. These potential intents may be displayed without any search results or as part of a SERP.

An example of automatic intent identification is a search engine explicitly associating certain query terms with certain intents. For example, a user may enter "cheap digital camera." Although a "cheap" intent might not be explicitly recognized by a search engine, the search engine may have associated "cheap" with "shopping," which is an intent recognized by the search engine. As another example, a user may enter "recent earthquakes." The search engine may have associated "recent" with a time-based indicator, which is used to determine that date and time information about earthquakes mentioned in webpages is to be included in abstracts of those webpages.

The association between one or more query terms and one or more intents may be (a) made by a user or (b) "learned" by one or more machine learning processes. For example, a process may learn that 75% of users that include "cheap" in queries select references (in the resulting SERP) to webpages that include pricing information.

Query Annotation

In an embodiment, intent identification includes annotating the query to generate an annotated query, which is subsequently used to identify the user's intent. A query may be annotated with (a) words that are synonyms of one or more terms in the query, (b) morphological variants of one or more terms in the query (e.g., "execute", "executed", "executable", and "executing" are all morphological variants of each other), and/or (c) entities. Entity recognition is a process that identifies entities, such as persons, places, or organizations, in a search query. Typically, entities include names, numbers, and/or upper-case lettering. For example, a query may include a name that is at least part of a popular nationwide restaurant. The search engine annotates the query with information that associates the name with the restaurant. Subsequently, based on this entity recognition, an intent identifier determines that a "location" intent is to be associated with the query because a restaurant name in a query tends to indicate that the user desires location information of the restaurant. Accordingly, the search engine performs a search based on the query to identify multiple search results. The search engine populates, for one or more of the search results, a "location" abstract template based on information contained in a webpage that corresponds to the search result. One technique for automatically recognizing entities is disclosed in U.S. patent application Ser. No. 12/251,146, entitled "SYSTEM FOR RESOLVING ENTITIES IN TEXT INTO REAL WORLD OBJECTS USING CONTEXT," which is incorporated by reference as if fully set forth herein.

Abstract Templates

An abstract template is a template, used by a search engine (or component thereof), to dictate which kind of information about a webpage should be displayed in an abstract generated for that webpage. Different abstract templates may indicate that different kinds of content should be extracted from a webpage (or other matching resource) for placement in that webpage's abstract. For example, a "location" abstract template may include the following fields:

a. a map field whose corresponding value will include a thumbnail image of a map of the location;
b. an address field whose corresponding value will indicate the address of the location (or "nearest" location if the location of the user is known and there are multiple locations, e.g., multiple Pizza Hut locations);
c. a description field whose corresponding value will indicate a description of the person, place, or thing at the location; and
d. optionally, a review field whose corresponding value will indicate a review (e.g., in the form of a number of stars) if the location is, for example, a restaurant, entertainment establishment, or recreational establishment.

As another example, a "shopping" abstract template may include the following fields:

a. a price field whose corresponding value will indicate a price of an item (whether product or service) associated with the one or more query terms;

b. an address field whose corresponding value will indicate the address (whether physical or online) of one or more stores that sell the item;

c. a view field whose corresponding value will include a thumbnail image of the item;

d. a review field whose corresponding value will indicate a review (e.g., in the form of a number of stars) of the item; and e. a description field whose corresponding value will indicate a description of the item.

Additionally or alternatively, an abstract template dictates how information about a webpage is to be displayed, to a user, in an abstract generated for that webpage; such information may indicate how the specified fields are to be organized on a SERP. For example, a location abstract template may indicate that the thumbnail map should be located to the left of the address and that the description should be below all other fields in the abstract.

FIG. 1 is a diagram that depicts abstracts of multiple search results 110-150, according to an embodiment of the invention. Each search result of search results 110-150 is generated from a different query. Each search result of search results 110-150 is associated with a different intent and, accordingly, a different abstract template. Thus, a different abstract template is used to display each of search results 110-150.

For example, search result 110 is displayed with a "Product" abstract template, search result 120 is displayed with a "Local" abstract template, search result 130 is displayed with a "Reviews" abstract template, search result 140 is displayed with an "Events" abstract template, and search result 150 is displayed with a "Discussion" abstract template.

As depicted in FIG. 1, each of search results 110-150 includes a clickable title at the top of the search result and a URL at the bottom of the search result. If a user selects the clickable title, the webpage of the corresponding URL is displayed in the user's browser. Each of search results 110-150 also includes information about the webpage to which that search result corresponds. For example, search result 110 (which corresponds to the "Product" abstract template) includes values for an original price, a sale price, and a date of the sale. Search result 110 also includes information about the book that is the subject of the search result. Such information includes the author and that the book was on a best sellers list.

Search result 120 (which corresponds to the "Local" abstract template) includes values for an address and a phone number.

Search result 130 (which corresponds to the "Reviews" abstract template) includes a value for the date on which the review was published and a description of the review system.

Search result 140 (which corresponds to the "Events" abstract template) includes values for the date and address of the corresponding event. Search result 140 also includes a description of the corresponding event.

Search result 150 (which corresponds to the "Discussion" abstract template) includes values for when a message was posted on the corresponding webpage and how many replies have been made to the message. Search result 150 also includes a description of the message.

In an embodiment, each intent that is recognized by the search engine is associated with a single abstract template. In this embodiment, there is a one-to-one mapping between intents and abstract templates. In a related embodiment, a single intent is associated with multiple abstract templates. For example, one "shopping" abstract template may correspond to home-based consumer electronic products whereas a different "shopping" abstract template may be constructed for hotel information and airline travel. The difference between these two shopping abstract templates may rely on what information about a webpage is to be displayed and/or how the information is to be displayed.

The information that is included in an abstract is not necessarily limited to the information within the corresponding webpage. Abstract information may be from another source (e.g., a database) that includes information about the webpage.

One advantage of certain embodiments of the invention is that the semantic web trend with RDF metadata may be leveraged. Thus, as more web masters adapt to RDF, the more structured information can be used for presentation in abstracts.

Query Processing

FIG. 2 is a flow diagram that depicts how an example query is processed, according to an embodiment of the invention. In the following description, for purposes of brevity, reference is made to a "search engine" performing the following steps. However, software or hardware components that are unrelated to search engine components may perform one or more of the following steps.

At step 210, a search engine receives a query from a user. The query comprises one or more terms.

At step 220, the search engine identifies, based on the query, one or more potential intents of the user. This step may comprise first annotating the query to generate an annotated query and then determining the one or more potential intents based on the annotated query.

At step 230, the search engine identifies a plurality of webpages based on the query. For example, the search engine may identify previously-discovered webpages that are deemed to be relevant to the query, perhaps due to those webpages' inclusion of one or more of the query terms. Specifically, this identification of webpages may also be based on the annotated query.

At step 240, for each webpage of the plurality of webpages, the search engine selects an abstract template from a plurality of abstract templates. The selection is based on the one or more potential intents identified in step 220. Specifically, in one embodiment, a mapping exists between an intent and one or more abstract templates. Thus, the search engine accesses the mapping and determines, based on each of the potential intents identified in step 220, one or more abstract templates. In a related embodiment, the search engine selects an abstract template for only a strict subset of the plurality of webpages, e.g., one webpage.

At step 250, the search engine generates a search results page that includes an abstract for each the plurality of webpages. The abstracts are generated based on the one or more selected abstract templates.

At step 260, the search engine sends the search results page to the user.

In an embodiment, a different abstract is used to display the same webpage in at least one different search result page. Specifically, in response to a first query, a first abstract of a particular webpage is displayed in a first search results page. The first abstract is displayed using a first abstract template. Subsequently, in response to a second query (either from the same user or a different user with respect to the first query) that is different than the first query, a second abstract of the particular webpage is displayed in a second search results page. The second abstract is displayed using a second abstract template that is different than the first abstract template even though the webpage to which both abstracts correspond is the same. The different abstract templates may be selected due to different intents identified for the different queries.

In an embodiment, a different abstract is used to display the same webpage in the same search results page. Specifically, in response to a query, a first abstract of a particular webpage is displayed in a search results page and a second abstract of the particular webpage is displayed in the search results page. The first abstract is displayed using a first abstract template and the second abstract is displayed using a second abstract template that is different than the first abstract template. In this scenario, multiple different intents may have been associated with the user that submitted the query. In that case, a single webpage may be listed twice in the search results page, but using different abstracts that correspond to the different intents.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
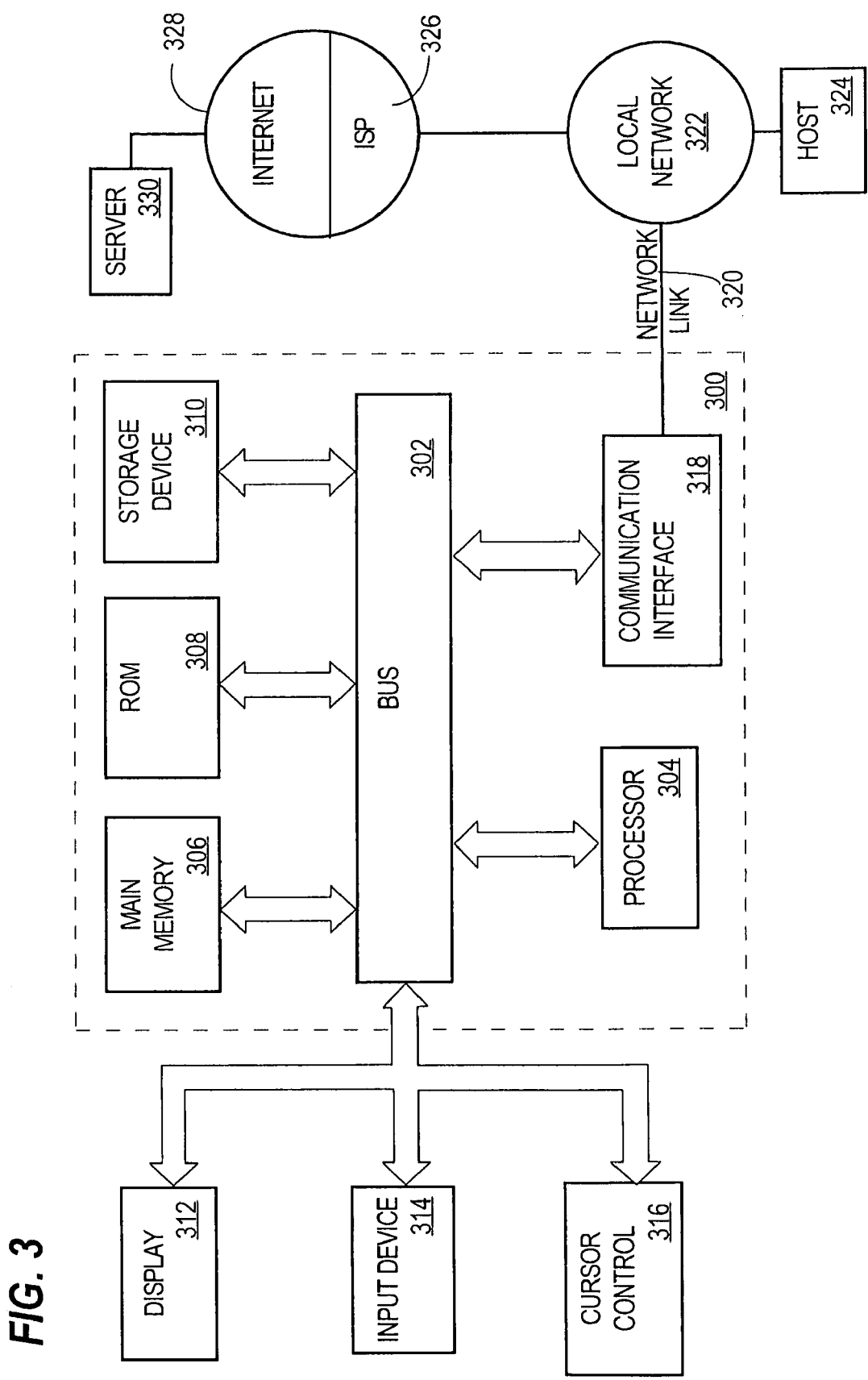
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method comprising:
   receiving a query from a user;
   based on the query, determining one or more potential intents of the user;
   based on the query, determining a plurality of matching resources that includes a first matching resource and a second matching resource that is different than the first matching resource;
   for the first matching resource of the plurality of matching resources, selecting, based on the one or more potential intents, a first abstract template from a plurality of abstract templates;
   for the second matching resource of the plurality of matching resources, selecting, based on the one or more potential intents, a second abstract template from the plurality of abstract templates;
   wherein each abstract template of the plurality of abstract templates:
      (a) corresponds to a different intent than any other intent to which any other abstract template of the plurality of abstract templates corresponds, and
      (b) dictates a different manner of displaying information about a resource than any other manner of displaying dictated by any other abstract template of the plurality of abstract templates; and
   generating a search results page that includes:
      for the first matching resource, a first abstract that is displayed based on the first abstract template, and
      for the second matching resource, a second abstract that is displayed based on the second abstract template;
   wherein the method is performed by one or more computing devices.

2. The method of claim 1, wherein the first abstract template corresponds to a first intent and the second abstract template corresponds to a second intent that is different than the first intent.

3. The method of claim 1, further comprising annotating the query to generate an annotated query, wherein determining the one or more potential intents of the user is based on the annotated query.

4. The method of claim 3, wherein annotating the query is based on one or more of the following: information about the user, time of day when the query was submitted by the user, geographical location of the user, and a history of web use of the user.

5. The method of claim 3, wherein annotating the query includes performing at least one of:
   identifying one or more synonyms of one or more words in the query and associating the one or more synonyms with the query,
   generating one or more particular words that are morphological variants of one or more words in the query and associating the one or more particular words with the query, or
   identifying one or more entities associated with one or more words in the query and associating the one or more entities with the query.

6. A machine-implemented method comprising:
   receiving a query from a user;
   determining a plurality of potential intents of the user;
   sending the plurality of potential intents to the user to be displayed;
   receiving, from the user, a selection of a particular intent from the plurality of potential intents;
   based on the query, determining a plurality of matching resources;
   for a particular matching resource of the plurality of matching resources, selecting, based on the particular intent, a particular abstract template from a plurality of abstract templates;
   wherein each abstract template of the plurality of abstract templates:
      (a) corresponds to a different intent than any other intent to which any other abstract template of the plurality of abstract templates corresponds, and
      (b) dictates a different manner of displaying information about a resource than any other manner of displaying dictated by any other abstract template of the plurality of abstract templates; and
   generating a search results page that includes, for the particular matching resource a particular abstract that is displayed based on the particular abstract template;

wherein sending the plurality of potential intents and receiving the selection of the particular intent are performed before generating the search results page;
wherein the method is performed by one or more computing devices.

7. The method of claim 1, wherein:
the query is a first query, the plurality of matching resources is a first plurality of matching resources, and the search results page is a first search results page;
the method further comprising after generating the search results page:
receiving a second query from a second user;
based on the second query, determining one or more second potential intents of the second user;
based on the second query, determining a second plurality of matching resources that includes the first matching resource that was included in the first plurality of matching resources;
for the first matching resource, selecting, based on the one or more second potential intents, a third abstract template from the plurality of abstract templates,
wherein the third abstract template is different than the first abstract template;
generating a second search results page that is different than the first search results page and that includes a third abstract for the first matching resource, wherein the third abstract is displayed based on the third abstract template.

8. A machine-implemented method of comprising:
receiving a query from a user;
based on the query, determining one or more potential intents of the user;
based on the query, determining a plurality of matching resources;
for a particular matching resource of the plurality of matching resources, selecting, based on the one or more potential intents, a first abstract template and a second abstract template from the plurality of abstract templates,
wherein the first abstract template is different than the second abstract template;
wherein each abstract template of the plurality of abstract templates:
(a) corresponds to a different intent than any other intent to which any other abstract template of the plurality of abstract templates corresponds, and
(b) dictates a different manner of displaying information about a resource than any other manner of displaying dictated by any other abstract template of the plurality of abstract templates; and
generating a search results page that includes:
for the particular matching resource, a first abstract that is displayed based on the first abstract template, and
for the particular matching resource, a second abstract that is displayed based on the second abstract template;
wherein the method is performed by one or more computing devices.

9. The method of claim 1, wherein:
at least one intent of the plurality of potential intents corresponds to the first abstract template and a third abstract template;
the third abstract template is not included in the plurality of abstract templates; and
selecting the first abstract template from the plurality of abstract templates also includes selecting, for the first matching resource, the third abstract template.

10. The method of claim 1, wherein each abstract template of the plurality of abstract templates dictates at least one of:
which information about a matching resource is to be displayed, or how information about a matching resource is to be displayed.

11. One or more storage media storing instructions which, when executed by one or more processors, cause the performance of the method of claim 1.

12. One or more storage media storing instructions which, when executed by one or more processors, cause the performance of the method of claim 2.

13. One or more storage media storing instructions which, when executed by one or more processors, cause the performance of the method of claim 3.

14. One or more storage media storing instructions which, when executed by one or more processors, cause the performance of the method of claim 4.

15. One or more storage media storing instructions which, when executed by one or more processors, cause the performance of the method of claim 5.

16. One or more storage media storing instructions which, when executed by one or more processors, cause the performance of the method of claim 6.

17. One or more storage media storing instructions which, when executed by one or more processors, cause the performance of the method of claim 7.

18. One or more storage media storing instructions which, when executed by one or more processors, cause the performance of the method of claim 8.

19. One or more storage media storing instructions which, when executed by one or more processors, cause the performance of the method of claim 9.

20. One or more storage media storing instructions which, when executed by one or more processors, cause the performance of the method of claim 10.

21. The method of claim 1, wherein:
each abstract template of the plurality of abstract templates dictates a different manner of displaying information extracted from a resource than any other manner of displaying dictated by any other abstract template of the plurality of abstract templates; and
information extracted from the first matching resource is Resource Description Framework (RDF) information extracted from the first matching resource.

22. One or more storage media storing instructions which, when executed by one or more processors, cause the performance of the method of claim 21.

* * * * *

UNITED STATES PATENT AND TRADEMARK OFFICE
CERTIFICATE OF CORRECTION

| | | |
|---|---|---|
| PATENT NO. | : 7,958,109 B2 | Page 1 of 1 |
| APPLICATION NO. | : 12/367225 | |
| DATED | : June 7, 2011 | |
| INVENTOR(S) | : Yi-An Lin et al. | |

It is certified that error appears in the above-identified patent and that said Letters Patent is hereby corrected as shown below:

COLUMN 13

Claim 8: Line 29: Please delete "method of comprising" and insert --method comprising--.

Signed and Sealed this
Sixteenth Day of August, 2011

David J. Kappos
*Director of the United States Patent and Trademark Office*